United States Patent [19]
Showalter et al.

[11] 3,820,523
[45] June 28, 1974

[54] INTERNAL COMBUSTION CHAMBER

[76] Inventors: Merle Robert Showalter, 4733 Shoremeade Rd., Richmond, Va. 23234; Samuel Rhine, R.F.D. 424A, Tillson, N.Y.

[22] Filed: Mar. 8, 1973

[21] Appl. No.: 339,158

[52] U.S. Cl. ............... 123/191 A, 123/191 R
[51] Int. Cl. ............................. F02b 23/00
[58] Field of Search .............. 123/191 A, 191 R

[56] References Cited
UNITED STATES PATENTS

| | | | |
|---|---|---|---|
| 1,490,849 | 4/1924 | Philip | 123/191 A |
| 1,559,439 | 10/1925 | Kapraun | 123/191 A |
| 1,631,706 | 6/1927 | Sokal | 123/191 A |
| 1,703,202 | 2/1929 | Moore | 123/191 A |
| 1,869,077 | 7/1932 | Prentice | 123/191 A |
| 2,075,388 | 3/1937 | De Cloud | 123/191 A |
| 3,408,995 | 11/1968 | Johnson | 123/191 A |

FOREIGN PATENTS OR APPLICATIONS

| | | | |
|---|---|---|---|
| 502,385 | 3/1939 | Great Britain | 123/191 A |
| 664,330 | 1/1952 | Great Britain | 123/191 A |

Primary Examiner—Wendell E. Burns
Attorney, Agent, or Firm—Witherspoon and Lane

[57] ABSTRACT

An insulator which may be ceramic or glass is bonded to the simple surfaces of an internal combustion engine combustion chamber by means of an intermediate layer of relatively elastic material which mediates the differential expansion between the insulator and the underlying combustion chamber supporting surfaces.

7 Claims, 4 Drawing Figures

PATENTED JUN 28 1974  3,820,523

INTERNAL COMBUSTION CHAMBER

BACKGROUND AND OBJECTS

Heat losses and thermal stresses are a major problem in internal combustion engine design, in fact thermal stresses are not infrequently the limiting factor in an engine design, particularly in diesel practice. The problem is particularly difficult because the calculation of thermal stresses is very nearly impossible for design purposes, and thermal stresses are superimposed on other mechanical stresses in often unpredictable ways. It has long been known, particularly in large diesel engine practice where thermal stresses in the piston are often a major source of problems, that the internal thermal stresses of the load bearing structure of pistons and heads could be very much reduced if the head surface and piston top could be successfully insulated with a ceramic, glass or other insulating layer. In practice this has not been possible, because in the past thermal stresses at the interface between the insulator and the metal have resulted in insulator-metal bond failure for ceramics sufficiently thick (over 0.015 inch) to be useful as insulators. This failure occurs because it is impossible to choose coefficients of expansion relations for the insulator and metal which do not result in unacceptable bond stresses during some part of the engine duty cycle (the relations best for warmup are worst for cooldown, for instance). The problem is a matter of stress at the interface: ceramics, glasses and other insulators which can tolerate internal thermal stresses much greater than those required of insulators for internal combustion engines have existed for some time.

The present invention solves the problem by providing a structure where a relatively thick insulating ceramic with sufficient resistance to internal physical and thermal stresses is bonded to a relatively elastic material, such as silicone rubber, which is then bonded to the metal supporting structure. The elastomeric layer is sufficiently thin, the ceramic layer is a sufficient heat barrier, and the supporting surface is sufficiently cool so that the elastomer is maintained below its weakening or deterioration temperature range at all times. Variations in thermal expansion between the ceramic insultor and the supporting structure are mediated by the elastic sandwich layer, so that the elastomer takes the strain caused by differential expansion with relatively little stress, because of the low Young's modulus of the elastomer.

This insulating technique permits engines to be built with reduced heat losses, and consequently better fuel economy and reduced cooling requirements. It also permits portions of an engine's combustion chamber to be maintained above the combustion quenching temperature, to reduce exhaust hydrocarbon emissions.

IN THE DRAWINGS

FIG. 1 shows a ceramic insulated piston constructed according to the present invention, showing an insulator centering means, FIG. 2 shows another ceramic insulated piston, showing another centering means, FIG. 3 shows a perforated turbulence plate equipped diesel engine with a piston top and combustion chamber insulated according to the present invention, and FIG. 4 shows a plan view of the ceramic perforated turbulence plate of the engine of FIG. 3.

DETAILED DESCRIPTION

Figure 1:
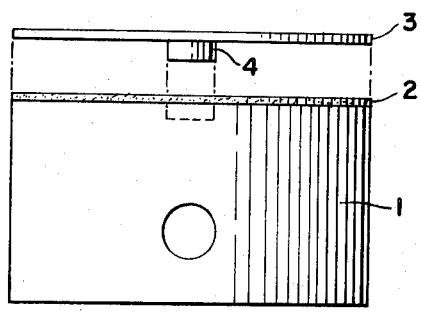

Referring to FIG. 1, flat top piston 1 is constructed of metal and is of conventional design. A layer of elastic material 2, which may be silicone rubber, is glued (for instance, by epoxy) onto the top of piston 1. A relatively thick ceramic insulator 3, shown raised to show indentation, such as an ultra low coefficient of expansion ultra-low conductivity glass, is glued by a suitable adhesive (such as an epoxy) onto elastic layer 2. In service, the relationships of the cooling, thicknesses, and coefficients of conductivity are such that the upper surface of insulator 3 can be as much as 1,100° F higher than the bottom surface of the insulator which is in contact with elastic layer 2, which will always be maintained below 350°F or at a low enough temperature so that the elastic still has sufficient tensile strength and does not degenerate in service. The amount of heat flux into the top of piston 1 is far less than it would be without the insulator. Thermal stresses in the metal piston are much reduced, and the piston structure is stronger in service since it operates at a lower temperature.

Ceramic insulator 3 is held centered on the piston 1 by means of a centered projection 4 which fits into a matched hole in piston 1. It is important that ceramic centering means be so designed as to apply its stresses symetrically: the centered projection is best for this, next best is to place the insulator in a disk-shaped centered recess in the piston (FIG. 2).

The dynamic mechanical forces on insulator 3 and elastic layer 2 which are not easily withstood compressive stresses are surprisingly small. The maximum inertial tensile stress (in psi) on elastic layer 2 is the acceleration (in g's) of the piston as it approaches TDC, which is less than 1,000g's at maximum RPM for normal engines times the weight (in pounds) of the insulator per square inch of insulator surface, which is of the order of 0.01 psi. Therefore, the maximum inertial tensile stress is of the order of ten pounds per square inch, which is much less than the tensile strength of available elastometric materials. The characteristics of the elastomer layer will assure that this load is taken (for a flat top piston) with very little stress concentration. The elastic will also serve to distribute compressive forces evenly over the ceramic and the piston, compensating for small geometrical irregularities which could otherwise be the cause of brittle fracture of the insulator.

Figure 3:
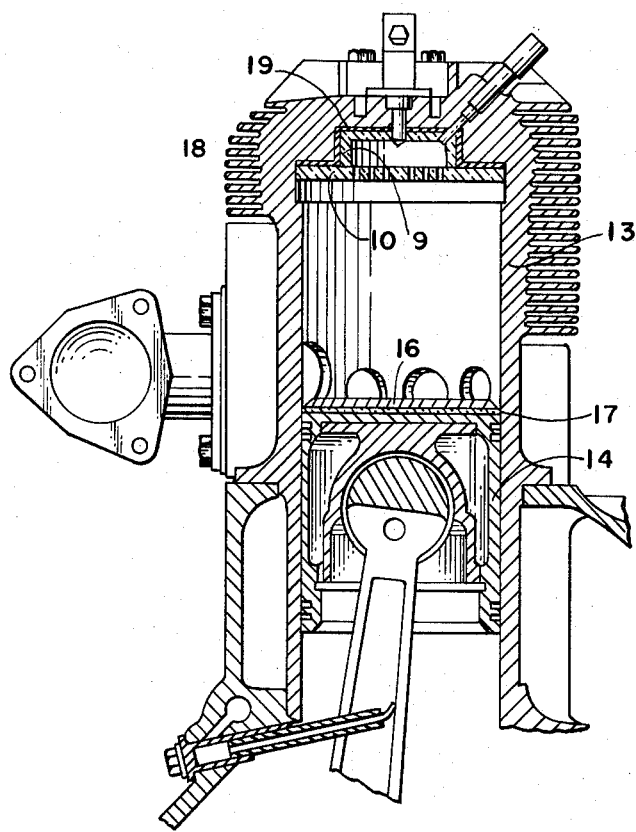

In the case of a insulated piston for a ported two-cycle engine, such as that of FIG. 3, there would be no net tensile forces on the piston elastomer is use.

Figure 2:
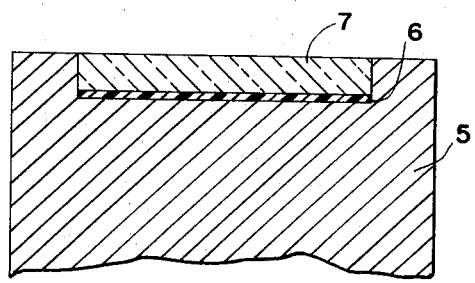

FIG. 2 shows section through another ceramic insulated piston. Piston 5 has a recessed top which receives insulator 7, and an elastomeric layer 6 which is bonded to both insulator 7 and piston 5. Layer 6 deforms to absorb the differential thermal expansion between insulator 7 and piston 5 in service.

The technique of attaching an insulator to an engine part through an elastomer layer to avoid thermal stresses at the ceramic-metal interface can work for other simply shaped surfaces besides piston tops, for instance on flat sections of heads on diesel engines. In this manner the very high thermal stresses of large diesel engines can be largely eliminated. FIG. 3 illustrates this.

FIG. 3 shows a modification of the Lycoming Schweitzer and Hussman design 2 cycle multifuel diesel where the dish piston of Schweitzer's design is substituted by a flat piston and turbulence is produced by an in-cylinder perforated turbulence plate for smoke free operation, which is the subject of copending application Ser. No. 272,944, filed July 18, 1972. The modification of Schweitzer's design does not change the scavenging characteristics of the Lycoming S&H engine. The insulated surfaces of the present invention greatly reduce the heat losses and thermal stresses of the engine and permit the engine to be operated with the very intense turbulence required to eliminate smoke, which turbulence might otherwise result in unacceptable thermal stresses.

Figure 4:
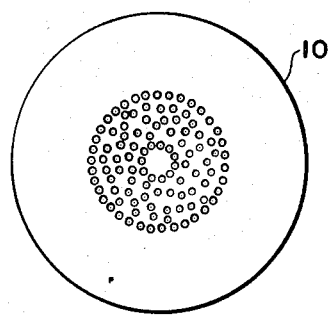

See FIGS. 3 and 4. As the piston 14 comes very near to perforated ceramic plate 10 (shown in FIG. 4) so that virtually all engine gas is forced through plate 10 into the chamber formed by ceramic cup 9 during compression, and flows from ceramic cup 9 back into cylinder assembly 13 during the power stroke. The top of piston 14 is covered with an insulating layer of ceramic 16 bonded through elastomer layer 17 in the manner described previously. In addition, ceramic perforated turbulence plate 10 is bonded to cylinder assembly 13 through elastomer layer 18. In like manner ceramic cup 9 is bonded to cylinder-head assembly 13 through elastomer layer 19. In this way the elastomer layers 17, 18, 19 will buffer the difference in thermal expansion and contraction between the insulating ceramic and the supporting metallic structure, and also serve to eliminate the stress concentrations which are so dangerous in a brittle, high Young's modulus material such as the ceramic insulating material.

The technique of bonding an insulator to an engine part through an elastomeric layer to avoid thermal stresses at the ceramic-metal interface is particularly attractive for the stationary parts in an engine, such as plate 10 and cup 9 of FIG. 3, since the only substantial stresses on the parts are compressive, rather than tensile forces.

We claim:

1. In an internal combustion engine having a combustion chamber with pressure supporting surfaces and wherein the pressure supporting surfaces are thermally insulated, the improvement comprising:
    a lining of insulating material on the pressure supporting surfaces, and
    a layer of elastomeric material between the insulating material and the pressure supporting surfaces to mediate differential thermal expansion between the insulating material and the combustion chamber pressure supporting surfaces.

2. In an internal combustion engine having a combustion chamber with a piston forming one surface of the combustion chamber surfaces, said surfaces being pressure supporting surfaces, and wherein the pressure supporting surfaces of the combustion chamber are thermally insulated, the improvement comprising:
    a lining of insulating material on the pressure supporting surfaces, and
    a layer of elastomeric material between the insulating material and the pressure supporting surfaces to mediate differential thermal expansion between the insulating material and the combustion chamber pressure supporting surfaces.

3. The invention as set forth in claim 2 and wherein the piston has a top and depending sidewalls, said top lining recessed to receive the lining of insulating material, the layer of elastometric material.

4. The invention as set forth in claim 2 wherein the piston has a top and said elastometric layer and insulating layer are secured across the entire top of said piston.

5. The invention as set forth in claim 4 and wherein the contact surface between said piston top and said insulating layer maintains said insulating material in a fixed position with respect to said piston top.

6. The invention as set forth in claim 2 and wherein adhesive means are provided for securing the insulating lining material to the elastomeric material and for securing the elastomeric material and the supporting surface.

7. The invention as set forth in claim 2 and wherein, a perforated turbulence barrier is supporting in the combustion chamber by the insulating material.

* * * * *